(12) United States Patent
Shteinbok et al.

(10) Patent No.: US 11,954,495 B1
(45) Date of Patent: Apr. 9, 2024

(54) DATABASE ACCELERATION WITH COPROCESSOR SUBSYSTEM FOR OFFLOADING TUPLE FILTERING

(71) Applicant: Amazon Technologies, Inc., Seattle, WA (US)

(72) Inventors: Michael Shteinbok, Netanya (IL); Yaniv Halmut, Ness Ziona (IL); Jonathan Cohen, Hod Hasharon (IL); Nofar Mann, Modi'in (IL); Tamir Malka, Ramat Gan (IL); Amit Abecasis, Ramat Gan (IL); Assaf Fainer, Kefar Sava (IL)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 17/643,777

(22) Filed: Dec. 10, 2021

(51) Int. Cl.
*G06F 9/38* (2018.01)
*G06F 16/245* (2019.01)
*G06F 16/2455* (2019.01)

(52) U.S. Cl.
CPC .......... *G06F 9/3877* (2013.01); *G06F 16/245* (2019.01); *G06F 16/2455* (2019.01); *G06F 16/24569* (2019.01)

(58) Field of Classification Search
CPC .. G06F 9/3877; G06F 16/245; G06F 16/2455; G06F 16/24569
See application file for complete search history.

(56) References Cited

U.S. PATENT DOCUMENTS

| | | | |
|---|---|---|---|
| 5,592,342 A | 1/1997 | Hall et al. | |
| 10,372,700 B2 * | 8/2019 | Asaad | G06F 16/2365 |
| 11,487,771 B2 * | 11/2022 | Lang | G06F 16/2471 |
| 2004/0139214 A1 * | 7/2004 | Hinshaw | G06F 16/2455 |
| | | | 707/E17.005 |
| 2008/0059489 A1 * | 3/2008 | Han | G06F 16/245 |
| 2008/0140661 A1 * | 6/2008 | Pandya | G11C 15/043 |
| 2018/0095750 A1 * | 4/2018 | Drysdale | G06F 9/50 |
| 2018/0239799 A1 * | 8/2018 | Hosogi | G06F 16/951 |
| 2019/0034493 A1 * | 1/2019 | Gopal | G06F 16/24561 |
| 2019/0324969 A1 * | 10/2019 | Fujimoto | G06F 3/064 |
| 2022/0156293 A1 * | 5/2022 | Seshadri | H03K 19/17752 |

OTHER PUBLICATIONS

Kim et al., "Fast, Energy Efficient Scan inside Flash Memory SSDs", The Second International Workshop on Accelerating Data Management Systems using Modern Processor and Storage Architectures (ADMS'11), 2011, 8 pages.*
U.S. Appl. No. 17/643,775, filed Dec. 10, 2021, Shteinbok et al.

(Continued)

*Primary Examiner* — David J. Huisman
(74) *Attorney, Agent, or Firm* — Weaver Austin Villeneuve & Sampson LLP

(57) ABSTRACT

To accelerate the data processing of a processor, a coprocessor subsystem can be used to offload data processing operations from the processor. The coprocessor subsystem can include a coprocessor and an accelerator. The accelerator can offload operations such as data formatting operations from the coprocessor to improve the performance of the coprocessor. The coprocessor subsystem can be used to accelerate database operations.

23 Claims, 10 Drawing Sheets

(56) References Cited

OTHER PUBLICATIONS

Fang, Y., et al., "Accelerating Raw Data Analysis with the ACCORDA Software and Hardware Architecture," PVLDB, vol. 12(11), 2019, pp. 1568-1582.

"Free space management in Operating System," 2019, pp. 1-6. URL: https://www.geeksforgeeks.org/free-space-management-in-operating-system/.

Hansen, K. B., "Splitting Delimited Text," in: Practical Oracle SQL, Chapter 9, 2020, pp. 145-168. URL: https://doi.org/10.1007/978-1-4842-5617-6_9.

"How to split a text file basis on its size," 2014, pp. 1-7. URL: https://www.codeproject.com/Questions/717591/how-to-split-a-text-file-basis-on-its-size.

Karagiannis, A., et al., "Scheduling strategies for efficient ETL execution," Information Systems, vol. 38(6), 2013, pp. 927-945.

U.S. Non-Final Office Action dated Sep. 29, 2023 in U.S. Appl. No. 17/643,775.

* cited by examiner

DATABASE ACCELERATION WITH COPROCESSOR SUBSYSTEM FOR OFFLOADING TUPLE FILTERING

BACKGROUND

Database operations typically involve variable length data. For example, database records may store string information such as words, names, addresses, etc. that can vary in the number of characters. Furthermore, numeric information such as account balances stored in database records can also vary in the number of digits. Some database records may also contain a combination of variable and fixed length data and/or a combination of strings and numeric data.

BRIEF DESCRIPTION OF THE DRAWINGS

Various embodiments in accordance with the present disclosure will be described with reference to the drawings, in which.

DETAILED DESCRIPTION

Executing database operations on large databases using a processor (e.g., a general purpose processor such as ARM, x86, etc.) can be slow and inefficient. One contributing factor is the need to handle variable length data. For example, when a query is made to retrieve database records, the data tuples are typically concatenated together into data chunks. In order for a processor to match, manipulate, and/or validate the data tuples, the processor may have to first determine the beginning and end of each data tuple in the data chunks before further processing can be performed. This can easily become a processing intensive task, especially when there are hundreds of thousands to millions of database records to process.

To reduce the workload for the processor, the techniques disclosed herein provide a coprocessor subsystem to offload database operations from the processor. The coprocessor subsystem includes a coprocessor to filter data tuples retrieved from a database to reduce the number of data tuples provided to the processor. The reduction in the number of data tuples provided to the processor reduces the workload of the processor, and speeds up completion of the database tasks. In some implementations, the coprocessor subsystem can also include an accelerator to parse the data chunks retrieved from a database, and align data tuples in the data chunks with the coprocessor's execution pipeline to further speed up the processing. For example, an accelerator can be used to align variable length data tuples from the data chunks before providing the data tuples to the coprocessor to offload the parsing and alignment operations from the coprocessor. Furthermore, the accelerator and/or the coprocessor can perform enhanced features such as finding matches in the data tuples and transforming the data tuples before providing them to the processor. These enhanced features further reduce the workload for the processor.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
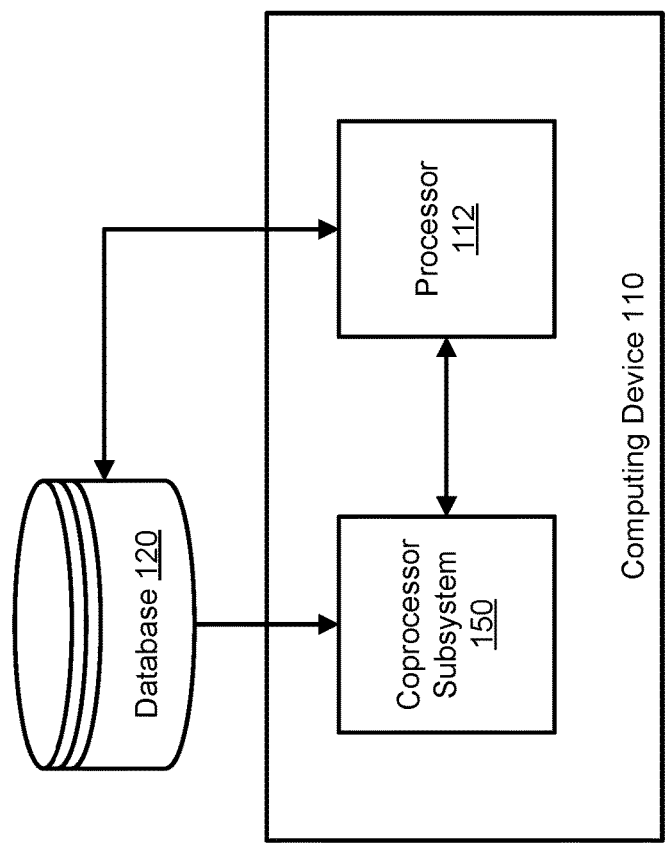
FIG. 1 illustrates a block diagram of an example of a database system.

FIG. 1 illustrates a simplified block diagram of an example of a database system 100. Database system 100 includes a database 120, and a computing system 110 that accesses database 120. Database 120 may include one or more storage devices to store data with indexing capabilities to expedite query processing. In some implementations, the data can be stored as persistent data (e.g., data on disks, drives, etc.), or the data can be stored as an in-memory database. The storage devices of database 120 can be part of a cloud data warehouse, and one or more storage devices can be centrally located or be remotely coupled via a network. Various database management system (DBMS) can be implemented such as relational (RDBMS), object-oriented (OODBMS), hierarchical, etc. One example of a database management system is a relational, structured query language (SQL)-capable database. The database can be row-oriented or column oriented.

Computing device 110 includes a processor 112 and a coprocessor subsystem 150. Computing device 110 may include additional components not specifically shown, such as those described with reference to FIG. 8 below. In some implementations, computing device 110 can be implemented as a system-on-chip (SoC) integrated circuit device. Computing device 110 may communicate with database 120 via a network. Computing device 110 can execute applications and tasks such as machine learning that may process and analyze large quantities of data. To provide sufficient storage capacity, the data can be stored at database 120, and can be queried by computing device 110 when needed. Database 120 also allows the data to be shared amongst multiple computing devices 110 for parallel computing. In some implementations, computing device 110 can be part of a server computer that interacts with database 120 and provides data to other client computers.

Processor 112 can be a general purpose processor, and may include multiple processing cores. Although processor 112 is capable of running queries and processing data retrieved from database 120, processing large quantities of data using processor 112 can be slow and inefficient. To reduce the workload for processor 112, computing device 110 may include a coprocessor subsystem 150 to offload database operations from the processor. For example, coprocessor subsystem 150 can perform a filtering operation on data tuples retrieved from database 120 to generate filtered data tuples, and provide the filtered data tuples to processor 112 for further processing. The filtering operation may include, for example, determining whether a data pattern is present in each of the data tuples, and providing only those of the data tuples with the matching data pattern to processor 112 for further processing. The filtering operation performed by coprocessor subsystem 150 can effectively reduce the amount of data analyzed and processed by processor 112.

To perform the filtering operation efficiently, coprocessor subsystem 150 can implement a coprocessor that is capable of performing vectorized processing. For example, the coprocessor can be a single instruction multiple data (SIMD) integrated circuit device that can perform operations on multiple data units in parallel when executing a single instruction. In this manner, the coprocessor can operate on multiple data tuples in parallel. In some implementations, the coprocessor can be implemented using a digital signal processor.

Although a coprocessor can efficiently process multiple data tuples in parallel, the data tuples retrieved from database 120 can be concatenated in the data chunks received from database 120, and the boundaries of the data tuples can be anywhere in the data chunks because the data tuples vary in length. As such, the coprocessor may need to parse the data chunks to obtain the data tuples, and align the data tuples with the execution pipeline to perform the filtering operation. To further speed up the database operations, coprocessor subsystem 150 can implement an accelerator to offload the parsing and alignment operations from the coprocessor.

Figure 2:
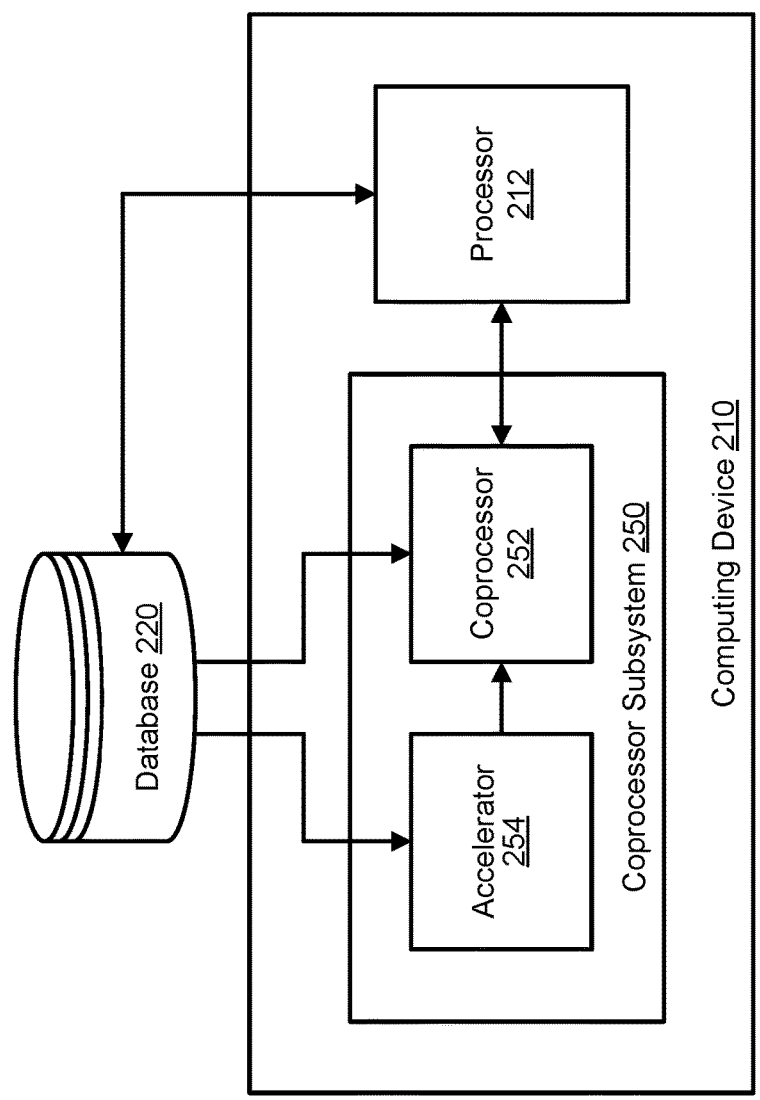
FIG. 2 illustrates a block diagram of another example of a database system.

FIG. 2 illustrates a simplified block diagram of another example of a database system 200. The Database system 200 and includes a database 220 and a computing device 210 that accesses database 220. The components of database system 200 can be similar to those of database system 100, and a detailed description of the similar components need not be repeated. Computing device 210 of database system 200 includes a coprocessor subsystem 250 that implements both a coprocessor 252 and an accelerator 254. Collectively, coprocessor 252 and accelerator 254 of coprocessor subsystem 250 can offload database operations from processor 212. Furthermore, accelerator 254 can offload database operations from coprocessor 252.

As mentioned above, accelerator 254 can be used to offload parsing and alignment operations from coprocessor 252 when the data records retrieved from database 220 includes variable length data tuples. When querying database 220, processor 212 can direct database 220 to provide data chunks with variable length data tuples such as string data tuples to accelerator 254, and data chunks with fixed length data tuples such as numeric data tuples to coprocessor 252. In some implementations, accelerator 254 can be a string accelerator, and all string data tuples can be directed to accelerator 254, and all numeric data tuples can be directed to coprocessor 252. In some implementations, database 220 may provide a combined data stream to coprocessor subsystem 250, and coprocessor subsystem 250 can separate the data stream for accelerator 254 and coprocessor 252, for example, by checking a datatype associated with a data chunk, and directing the data chunk to the appropriate processing component based on the datatype.

Accelerator 254 is an integrated circuit device with dedicated hardware circuitry to perform parsing and alignment operations. In addition to parsing data tuples from the data chunks received from database 220 and realigning the data tuples, accelerator 254 may also generate metadata to inform coprocessor 252 of the structure and characteristics of the data tuples. In some implementations, accelerator 254 may have the capability to perform additional operations on the data tuples such as matching and data replacement, and provide the results as metadata to coprocessor 252 to offload such operations from coprocessor 252.

By way of example, accelerator 254 can be a string accelerator operable to process string data tuples, and coprocessor 252 is operable to process numeric data tuples. Accelerator 254 may receive string data tuples concatenated in data chunks from database 220, and parse the data chunks to obtain the string data tuples. Accelerator 254 may rearrange the string data tuples such that they are aligned with the processing pipeline of coprocessor 252, and provide the string data tuples with the associated metadata describing the string data tuples to coprocessor 252.

Coprocessor 252 may receive the string data tuples from accelerator 254 as well as numeric data tuples from database 220. Coprocessor 252 can be operable to filter both numeric data tuples and string data tuples. For example, coprocessor 252 may include a set of configurable data pattern registers that can be programmed with respective data patterns. Each of the data patterns can be used to represent, for example, a numeric value, a set of numeric values, a character, a substring, or a full string. Coprocessor 252 can be operable to determine whether any one or more of the programmed data patterns or certain combination of the programmed data patterns is present in each of the data tuples. Coprocessor 252 can be configured to provide only those of the data tuples having a match to processor 212, or provide only those of the data tuples that do not have a match to processor 212 for further processing. In some implementations, coprocessor 252 may also include a set of configurable substitute data registers that can be programmed with respective substitute data, and coprocessor 252 can be programmed to replace data in the data tuples matching a data pattern with the substitute data by pairing one or more of the data pattern registers with a substitute data register. Coprocessor 252 can also be operable to perform multiple replacements by setting up multiple pairings of data pattern registers with substitute data registers. Coprocessor 252 can also perform aggregation operations on the data tuples. For example, coprocessor 252 may compute an aggregation result on the data tuples such as computing a sum, an average, a mean, a sum of squares, etc. on the values stored in the data tuples. In some implementations, the aggregation operations can be performed on filtered data tuples (e.g., a subset of data tuples that satisfy a certain condition).

In some implementations, accelerator 254 can be used to offload some of the filtering, matching, and/or replacement operations from coprocessor 252. For example, accelerator 254 can be operable to filter string data tuples, and provide the filtered string data tuples to coprocessor 252 to reduce the workload of coprocessor 252. Similar to coprocessor 252, accelerator 254 may include its own set of configurable data pattern registers that can be programmed with respective data patterns. Each of the data pattern can be used to represent, for example, one or more characters, a substring, or a full string, and the configurable data pattern registers can be used in a similar manner as coprocessor 252. In some implementations, instead of filtering the string data tuples based on a pattern match, accelerator 254 may, for example, determine whether one or more characters or a substring is present in the string data tuples or compare a full string to the string data tuples, and provide an indication of which string data tuple contains a match in the metadata to coprocessor 252. The metadata may also include one or more locations within a string data tuple where the match is found. Accelerator 254 may also include its own set of configurable substitute data registers that can be programmed with respective substitute data, which can be used in a similar manner as coprocessor 252 to perform data replacement. Any of these enhanced features can be independently turned on or off in accelerator 254. It should also be understood that any of the functions described with respect to accelerator 254 can be implemented in the coprocessor 252, and the role of which component performs which function can be configurable.

Coprocessor 252 and/or accelerator 254 may also implement flow control logic to limit the amount of data being processed at a time. For example, coprocessor 252 and/or accelerator 254 may include one or more counters to count the number of input data bytes, input data tuples, output data bytes, and/or output data tuples being processed. Any of such counters can be programmed with a limit value such that when the counter reaches the limit value, the data processing of the coprocessor and/or accelerator 254 is halted. The data processing can be restarted, for example, when instructed to do so by processor 212. For instance, processor 212 can reset the counters to restart the data processing.

It should be noted that although coprocessor subsystem 250 is described as accelerating database operations, the architecture of coprocessing subsystem 250 can also be used to accelerate other types of data processing operations. In other words, other types of data processing that would otherwise be performed by processor 212 can be performed by coprocessor subsystem 250 to free up computing resources on processor 212. Coprocessor 252 can be used to offload data operations from the processor, and accelerator 254 can perform data formatting operations for the coprocessor 252. Examples of data processing that can benefit from such a coprocessor subsystem architecture may include data encryption, network packet processing, digital signal processing such as video encoding/decoding, design automation, etc.

Figure 3:
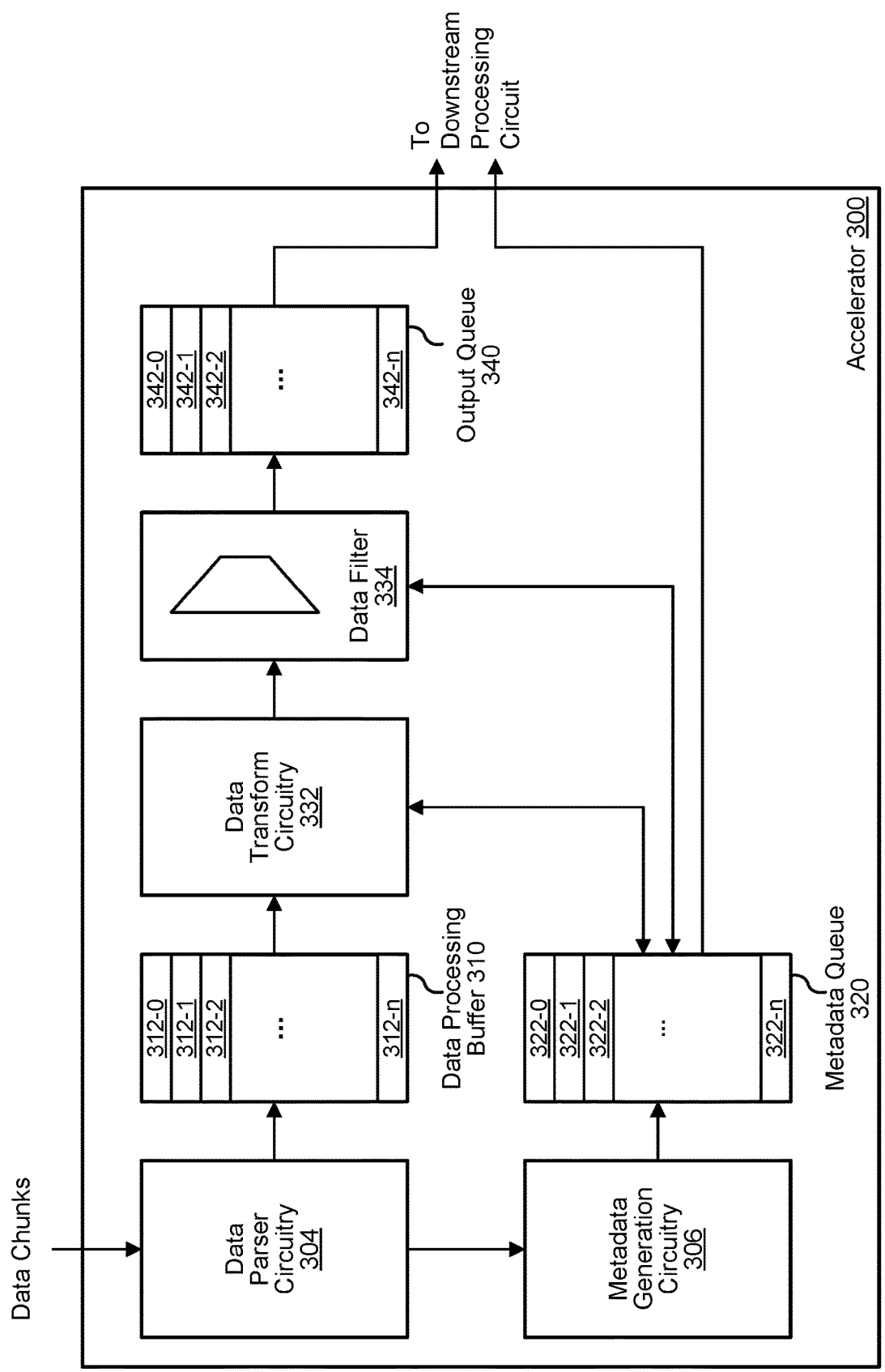
FIG. 3 illustrates a block diagram of an example of an accelerator.

FIG. 3 illustrates a simplified block diagram of an example of an accelerator 300. Accelerator 300 can be used, for example, to implement accelerator 254 of computing device 210, and in some implementations, can be a string accelerator. Accelerator 300 may data parser circuitry 304, metadata generation circuitry 306, data transformation circuitry 332, and data filter circuitry 334. Accelerator 300 may further include a data processing buffer 310, a metadata queue 320, and an output queue 340.

Data parser circuitry 304 is operable to receive data chunks streamed into accelerator 300. The data chunks may including data tuples of variable lengths and/or fixed lengths retrieved from a database. The data tuples can be, for example, string data tuples. In some implementations, the data tuples may also include numeric data tuples or a combination of both. Data parser circuitry 304 is operable to parse the data chunks in the data buffer to identify the data tuples in the data chunks. For example, each data tuple appearing in the data chunks may start with a header indicating a length of the data tuple. Data parser circuitry 304 may include a counter that counts the number of bytes from the header to determine where the current data tuple ends and the next data tuple begins. In some implementations, the header with length information can be received on a separate data stream from the data tuple contents, but the parsing operation can be performed in a similar manner. Data parser circuitry can also parse the data chunks according to a constant value for fixed length data tuples. Data parser circuitry 304 is also operable to identify delimiters in the data chunks, and separate out the delimited data into individual data tuples. For example, a configuration register can be programmed with one or more delimit characters such as a space, a comma, a semicolon, a colon, or other suitable character. One or more of the delimit characters can be enabled, and each section of the data chunks separated by the enabled delimit character(s) can be identified as an individual data tuple.

Upon identifying the data tuples in the data chunks, data parser circuitry 304 can align the data tuples for storing in data processing buffer 310. Data processing buffer 310 includes a set of data entries 312-0 to 312-$n$. The data entries have a fixed length, and the fixed length of the data entries may correspond to the data length that the instructions of the coprocessor operates on. For example, if the downstream coprocessor implements an instruction set that operates on 64-byte data vectors, each entry in data processing buffer 310 can be 64 bytes in length. Examples of other byte lengths that can be implemented includes 16 bytes, 32 bytes, 128 bytes, or other byte length depending on the architecture of coprocessor.

Data parser circuitry 304 is operable to align a first data tuple of the data chunks to be stored starting at a beginning of a first data entry 312-0 in the data processing buffer 310. Thereafter, assuming the first data tuple is shorter than the data entry length, if the next data tuple can fit in the remaining available space of the first data entry 312-0, the next data tuple is stored there. If not, the next data tuple is stored starting at the beginning of the next data entry 312-1. Hence, a data entry can store a complete data tuple if the data tuple fits into one data entry, as well as more than one data tuples if multiple complete data tuples can fit into one data entry. If the first data tuple is longer than the data entry length, then the first data tuple can be stored using multiple data entries. The next data tuple can be stored in a similar manner as mentioned above—either in the last data entry of the current data tuple if there is enough space, or start at the next data entry. Put another way, data parser circuitry 304 is operable to align a start of each subsequent data tuple that is longer than the available space of the current data entry to be stored starting at the beginning of the next data entry in the data queue. Subsequent data tuple can fit in the available space of the current data entry are stored in the current data entry. In this manner, data parser circuitry 304 can store two or more data tuples in a single data entry, or a data tuple can be stored in two or more data entries depending on the lengths of the data tuples. The beginning of each data entry is either the start of a data tuple, or a continuation of a data tuple that occupies the entire previous data entry. In some implementations, data parser circuitry 304 can also be configurable to start every data tuple at the beginning of a data entry. It should also be noted that the data tuples are stored in data processing buffer 310 in the same order as they are received in the data chunks.

When multiple data tuples can fit in a single data entry, data parser circuitry 304 can be configurable to concatenate the multiple data tuples together for storing in the data entry, or to align the multiple data entries at evenly spaced byte widths. Such alignment to a certain byte width can be useful, for example, if a downstream device (e.g., a coprocessor) implements SIMD instructions to concurrently process multiple data units using a single instruction. The length of the data entry can correspond to the maximum data length that an instruction can process, and the number of evenly spaced byte width within a data entry can correspond to the maximum number of data units that an instruction can process. For example, if an instruction can process up to four data units of 16 bytes in parallel for a total of 64 bytes, then each data entry can have a fixed length of 64 bytes, and the evenly space byte widths in a data entry can be set to 16 bytes. Under this example, up to four data tuples each with a maximum length of 16 bytes can be stored in a single data entry aligned to the evenly spaced byte widths.

Metadata generation circuitry 306 is operable to process the data tuples parsed by data parser circuitry 304, and to generate metadata for storing in the metadata entries 322-0 to 322-n of metadata queue 320. Each metadata entry in metadata queue has a one-to-one correspondence with a data entry in data processing buffer 310. In other words, the metadata stored in metadata entry 322-0 corresponds to the data stored in data entry 312-0; the metadata stored in metadata entry 322-1 corresponds to the data stored in data entry 312-1; and so on. The metadata is used by accelerator 300 to describe the data stored in the corresponding data entry, and can be provided to the coprocessor together with the data of the corresponding data entry.

In some implementations, the metadata generated for each data entry may include a bit mask vector indicating a location of each data tuple stored in the data entry. As mentioned above, a data entry can store more than one data tuple. The bit mask vector can be used to identify the location of each data tuple stored in the data entry. By way of example, suppose a data entry is 64 bytes in length and the maximum number of data tuples that can be stored in a data entry is 8. In such a scenario, the bit mask vector will be a data structure representing a 8×64 bit array. The 8 rows of the bit array represent the maximum number of data tuples that can be stored in a single data entry, and the 64 columns represent the byte location in the data entry where the bytes of a data tuple are located. In some implementations, the metadata indicating the locations of each data tuple in a data entry can be represented as, for each data tuple, a starting index of the data tuple in the data entry and a length of the data tuple.

The metadata may also include, for each data entry, one or more of the number of valid bytes in the data entry, the number of data tuples in the data entry, the number of starting data tuples in the data entry, and/or the number of ending data tuples in the data entry. The starting and ending data tuples can be used to identify data tuples that are longer than a data entry. For example, a long data tuple starting at a data entry will have the starting data tuple metadata indicated as 1, and the ending data tuple metadata indicated as 0. If the data tuple is longer than two data entries, the following data entry will have the starting data tuple metadata indicated as 0, and the ending data tuple metadata indicated as 0, because the data entry is filled with the middle bytes of the data tuple. The last data entry storing the data tuple will have the starting data tuple indicated as 0, and the ending data tuple metadata indicated as 1, assuming no other data tuples are stored in the same data entry.

In some implementations, if accelerator 300 supports enhanced features such as matching and data replacement, the metadata entry corresponding to a data entry may include metadata indicating if a character, a set of characters, a substring, or full string has a match with the data stored in the data entry. The indication can be, for example, a count of the number of matches in the data entry for a data pattern. The metadata may also include information indicating the location in the data entry of the match (e.g. a starting index or a pattern match bit mask). For replacement data, the metadata can include information as to the location of the data in the data entry being replaced.

Data transformation circuitry 332 is operable to perform transformation operations on the data tuples stored in data processing buffer 310 to generate transformed data tuples. The transformation operations may include data replacement to replace one or more data patterns with corresponding substitute data patterns. A data pattern can be a character or sequence of characters, and the substitute data pattern need not be the same length as the data pattern being replaced. The transformation operations may also include data insertion, data deletion, and/or data transposition. Any transformation operations performed on the data tuples can be reflected in their corresponding metadata.

Data filter 334 is operable to filter the data tuples before providing the data tuples to a downstream processing circuit. For example, data filter 334 can discard data tuples according to certain condition or combination of conditions. Such conditions can include data tuples containing a data pattern or combination of data patterns, data tuples lacking a data pattern or combination of data patterns, data tuples exceeding and/or smaller than a certain length, data tuples matching a certain length, data tuples not having a certain length, data tuples containing or lacking a certain value, minimum value, and/or maximum value, etc. Data filter 314 can reduce the amount of data being processed by the downstream processing circuit (e.g., coprocessor 252). In some implementations, the filtering performed by data filter 334 can be reflected in the metadata entries of metadata queue 320. The data entries corresponding to data tuples that satisfy the filtering condition(s) can be written into the output entries 342-0 to 342-n in output queue 340 for forwarding to the downstream processing circuit. Data filter 334 can also be disabled such that all data entries are forwarded.

In some implementations, accelerator 300 can be programmed to forward the data entries of the filtered data tuples and their corresponding metadata entries to the downstream processing circuit. Accelerator 300 can be programmed to forward the data entries of the filtered data tuples and all metadata entries (including metadata for filtered out data tuples) to the downstream processing circuit. Accelerator 300 can be programmed to forward all data tuples and their corresponding metadata entries to the downstream processing circuit. Accelerator can also be programmed to output the metadata entries without any corresponding data entries. This option can be used, for example, to just return the indexes of found patterns. The option to output metadata without the corresponding data entry can be enabled or disabled, for example, based on an indicator in query depending on the type of query being submitted.

Although accelerator 300 has been described as performing the various operations in a certain order in the implementation shown in FIG. 3, other implementation can perform the data processing operations in a different order or sequence. For example, in some implementation, the data filtering can be performed before the data transformation. In some implementations, the hardware can support different order or sequence of operations, and accelerator 300 can be configured to perform a specific order or sequence of operations, and then be reconfigured to perform a different order or sequence of operations.

Figure 4:
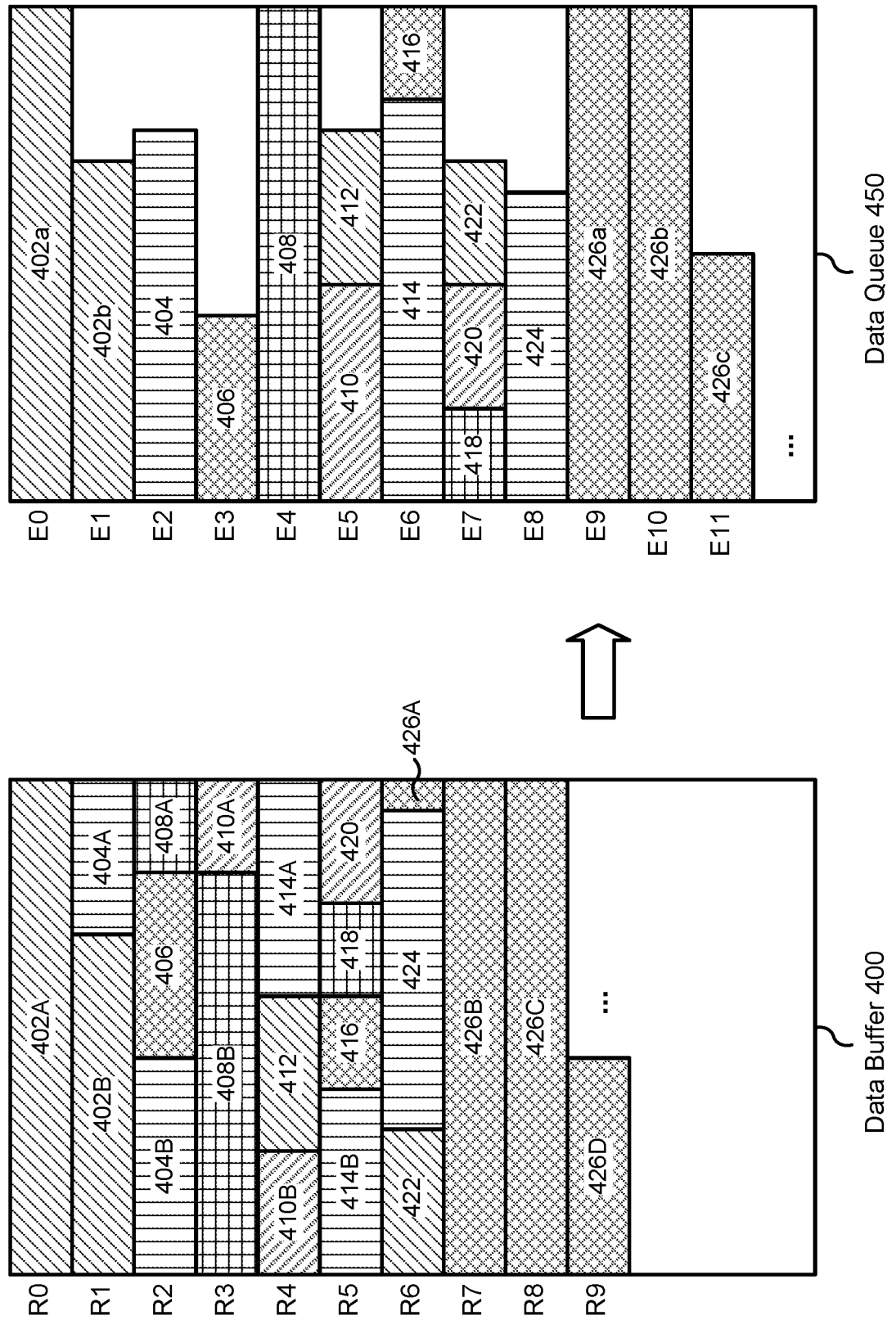
FIG. 4 illustrates a conceptual diagram of an example of data tuple alignment.

FIG. 4 illustrates a conceptual diagram of an example of the data alignment operation that can be performed by a data parser circuitry (e.g., data parser circuitry 304). When data is retrieved from a database and provided to data buffer, the data can be received as data chunks in which data tuples are concatenated together. For example, referring to data buffer 400 shown on the left side of FIG. 4, the received data may include data tuples 402, 404, 406, 408, 410, 412, 414, 416, 418, 420, 422, 424, and 426 of variable lengths concatenated together, and the received data can be stored into data buffer 400 as shown in FIG. 4. Data tuple 402 may occupy rows R0 and R1 of data buffer 400, and is shown as data portions 402A and 402B. Data tuple 404 may occupy rows R1 and R2, and is shown as data portions 404A and 404B. Data tuple 406 may occupy row R2. Data tuple 408 may occupy rows R2 and R3, and is shown as data portions 408A and 408B, and so on for the remaining data tuples.

As discussed above, the data parser circuitry will align the data tuples to start at the beginning of a data entry in the data queue unless a previous data entry has sufficient space for the data tuple. Referring to data queue 450 shown on the right side of FIG. 4, each row represents a data entry in data queue 450. The data entries E0 to E11 have a fixed length, but depending on the lengths and sequence of the data tuples, not all data entries are completely filled. It should be noted that although the length of the data entries in data queue 450 appears to be the same as the width of data buffer 400, the two need not be the same and is only shown as such for ease of explanation.

The data parser circuitry will place the first data tuple 402 to start at the beginning of the first data entry E0. Because the length of data tuple 402 is longer than the length of the data entry, data tuple 402 overflows to the next data entry E1. The data tuple 402 is shown as data portions 402a and 402b. Although there is still space left in data entry E1, the length of next data tuple 404 is longer than the remaining space in data entry E1. As such, the data parser circuitry places data tuple 404 to start at the beginning of data entry E2. Next, data tuple 406 does not fit in the remaining space of data entry E2, and thus data tuple 406 is placed to start at the beginning of data entry E3. Similarly, data tuple 408 does not fit in the remaining space of data entry E3, and thus data tuple 408 is placed to start at the beginning of data entry E4 and takes up the entire data entry.

Data tuple 410 is placed at the beginning of data entry E5. The remaining available space in data entry E5 is sufficient to store data tuple 412, and thus data tuple 412 is also placed in data entry E5. After storing both data tuples 410 and 412, the remaining space in data entry E5 is insufficient to fit data tuple 414, and thus data tuple 414 is placed to start at the beginning of data entry E6. The remaining space in data entry E6 is just enough to fit data tuple 416, and thus data tuple E6 is placed in data entry E6. The remaining data tuples are aligned to the data entries in a similar manner to place data tuples 418, 420, and 422 in data entry E7, and data tuple 424 in data entry E8. Data tuple 426 is longer than two data entries, and this data tuple is placed in data entries E9, E10, and E11 as data portions 426a, 426b, and 426c.

The length of the data entries in data queue 450 corresponds to the data length that the instructions executed by the downstream coprocessor operates on. The data tuples can thus be provided to the coprocessor that is already aligned with the execution pipeline of the coprocessor. In this manner, it is unnecessary for the coprocessor to waste processing cycles to realign the data tuples. Each data entry either starts with a new data tuple, or is a continuation of a previous data tuple.

It should be noted that in some implementations, the beginning byte(s) of each data tuple may correspond to a header of the data tuple. The header can be, for example, two to four bytes long, and may include information such as the length of the data tuple. The header can remain with the data tuple, and can be provided to the coprocessor intact with the remaining of the data tuple. In some implementations, the header is provided on a separate channel to the accelerator. In such scenarios, the header can be provided to the coprocessor as part of the metadata corresponding to the data entry storing the beginning of the data tuple.

Figure 5:
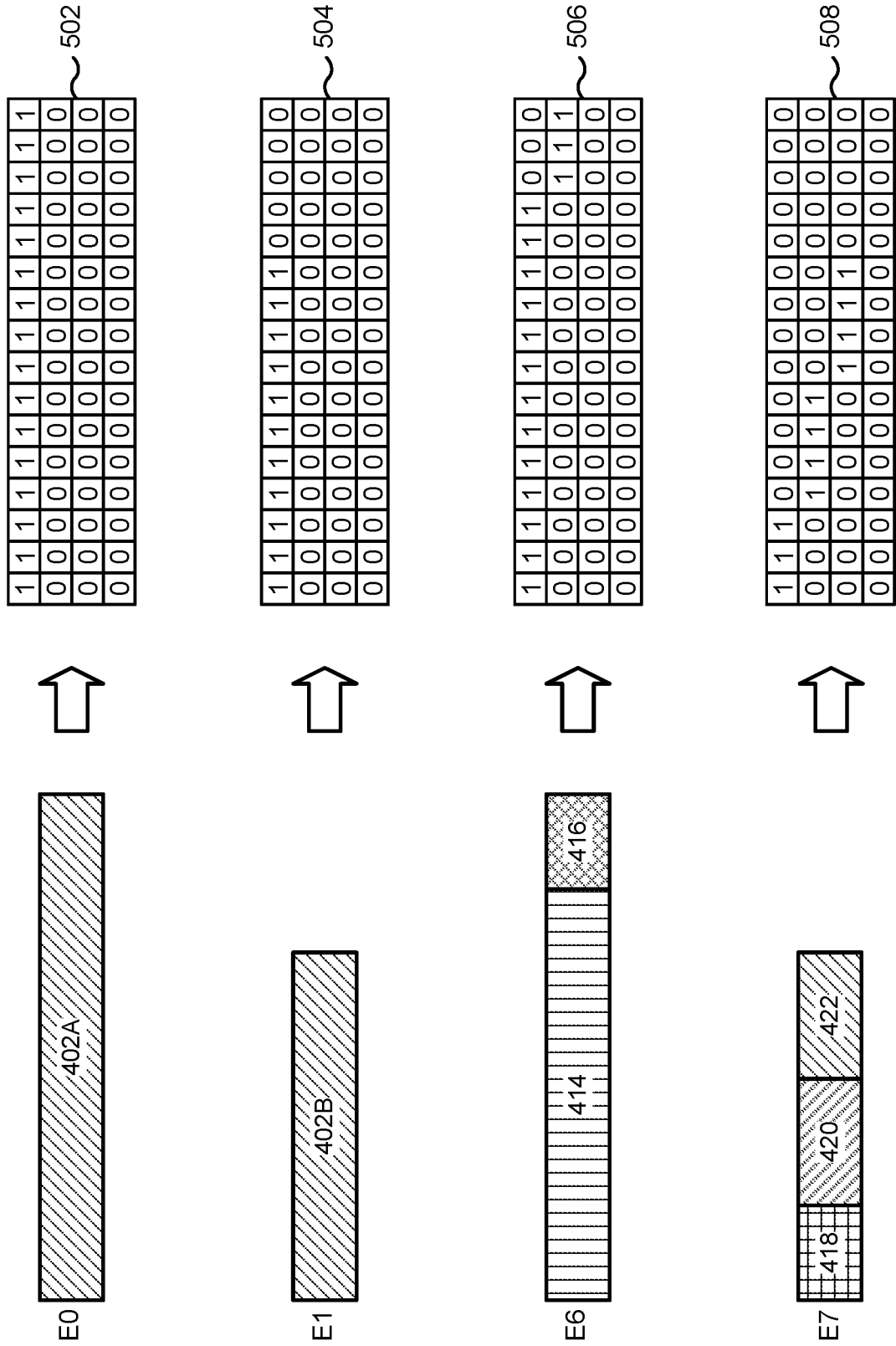
FIG. 5 illustrates a conceptual diagram of examples of bit masks.

FIG. 5 illustrates examples of bit mask vector metadata generated for various corresponding data entries taken from data queue 450. Referring to FIG. 5, for ease of explanation, it is assumed that the length of each data entry is 16 bytes, and the maximum number of data tuples allowed to be placed in the same data entry is four data tuples. Hence, the bit mask vector can be represented as a 4×16 bit array, with each bit representing a byte of the data entry. It should be understood that other implementations may use a different data entry length and/or a different maximum number of data tuples allowed in a data entry.

Referring to data entry E0 from data queue 450, data entry E0 contains a partial data tuple being the first data portion 402A of data tuple 402. Given all 16 bytes of data entry E0 are occupied and the data belongs to one data tuple, bit mask vector 502 has all 16 bits in the first row set to '1', and all other bits are set to '0'. This indicates that the entire data entry contains valid data for one data tuple. Examples of other metadata that can be generated for data entry E0 includes the number of data tuples being 1, the number of valid bytes being 16, the number of starting data tuples being 1, and the number of ending data tuples being 0.

Referring to data entry E1 from data queue 450, data entry E1 contains a partial data tuple being the remaining data portion 402B of data tuple 402. Data portion 402B occupies the first 11 bytes of data entry E1, and the data belongs to one data tuple. Hence, bit mask vector 504 has the first 11 bits in the first row set to '1', and all other bits are set to '0'. This indicates that the data entry E1 contains 11 valid bytes for one data tuple. Examples of other metadata that can be generated for data entry E1 includes the number of data tuples being 1, the number of valid bytes being 11, the number of starting data tuples being 0, and the number of ending data tuples being 1.

Referring to data entry E6 from data queue 450, data entry E6 contains two data tuples 414 and 416. Data tuple 414 occupies the first 13 bytes of data entry E6, and data tuple 416 occupies the remaining 3 bytes of data entry E6. Hence, bit mask vector 506 has the first 13 bits in the first row set to '1', the last 3 bits of the second row set to '1', and all other bits are set to '0'. This indicates that the data entry E6 contains a first data tuple 414 occupying the first 13 bytes, and a second data tuple 416 occupying the last 3 bytes. Examples of other metadata that can be generated for data entry E6 includes the number of data tuples being 2, the number of valid bytes being 16, the number of starting data tuples being 2, and the number of ending data tuples being 2.

Referring to data entry E7 from data queue 450, data entry E7 contains three data tuples 418, 420, and 422. Data tuple 418 occupies the first 3 bytes of data entry E7, data tuple 420 occupies the next 4 bytes of data entry E7, and data tuple 422 occupies the remaining 4 bytes of data entry E7. Hence, bit mask vector 508 has the first 3 bits in the first row set to '1', the next 4 bits of the second row set to '1', the next 4 bits of the third row set to '1', and all other bits are set to '0'. This indicates that the data entry E7 contains a first data tuple 418 occupying the first 3 bytes, a second data tuple 420 occupying the next 4 bytes, and a third data tuple 422 occupying the next 4 bytes. Examples of other metadata that can be generated for data entry E7 includes the number of data tuples being 3, the number of valid bytes being 11, the number of starting data tuples being 3, and the number of ending data tuples being 3.

Figure 6:
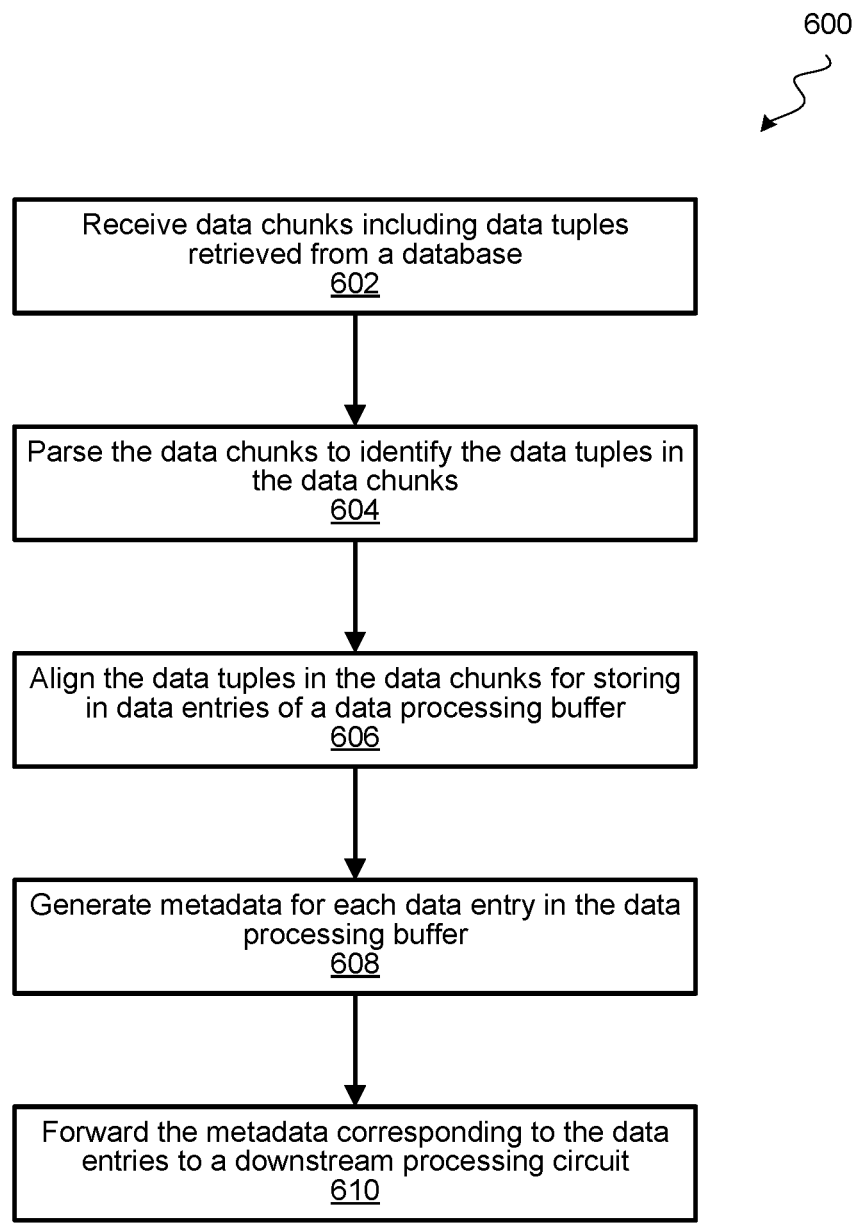
FIG. 6 illustrates a flow diagram of an example of an acceleration process.

FIG. 6 illustrates a flow diagram of an example of a process 600 for accelerating database operations. Process 600 can be performed, for example, by an accelerator, a coprocessor, or other suitable integrated circuit device to offload the operations from a processor. Process 600 may begin at block 602 by receiving data chunks including data tuples of variable lengths and/or fixed lengths retrieved from a database. The data tuples can be, for example, string data tuples. The data chunks being received may concatenate the data tuples together. In some implementations, each data tuple includes a header at the beginning of the data tuple. Alternatively, the header of each data tuple can be received on a separate data stream.

At block 604, the data chunks are parsed to identify the data tuples in the data chunks. For example, the header of each data tuple may contain the length of the data tuple indicating the number of bytes in the data tuple. A counter can be used to count the number of sequential bytes in the data chunks to determine where the current data tuple ends and the next data tuple begins.

At block 606, the data tuples in the data chunks are aligned for storing in fixed length data entries of a data processing buffer. For example, the first data tuple can be stored starting at the beginning of the first data entry in the data processing buffer. If the first data tuple is longer than the data entry, the remaining bytes of the first data tuple are stored in one or more subsequent data entries. For each subsequent data tuple that can fit in the available space of the current data entry, the data tuple is appended to the current data entry. For each subsequent data tuple that is longer than the available space of the current data entry, the data tuple is stored starting at the beginning of the next data entry in the data processing buffer.

At block 608, metadata is generated for each data entry in the data processing buffer. The metadata generated for each data entry may include a bit mask vector indicating a location of each data tuple stored in the data entry, or a starting index of the data tuple in the data entry and a length of the data tuple. The metadata may also include, for each data entry, the number of valid bytes in the data entry, the number of data tuples in the data entry, the number of starting data tuples in the data entry, and/or the number of ending data tuples in the data entry.

At block 610, the metadata corresponding to the data entries are forwarded to a downstream processing circuit such as a coprocessor or a processor. The metadata can be forwarded with or without their corresponding data entries to the downstream processing circuit. In implementations in which the data entries are forwarded, the length of the data entries may correspond to the data length of the instructions that the downstream processing circuit operates on. For example, if the instructions of the downstream processing circuit operate on 64-byte data, then the length of the data entries in the data queue can be set to 64 bytes. In this manner, the downstream processing circuit need not spend processing cycles to realign the data tuples before operating on them.

Figure 7:
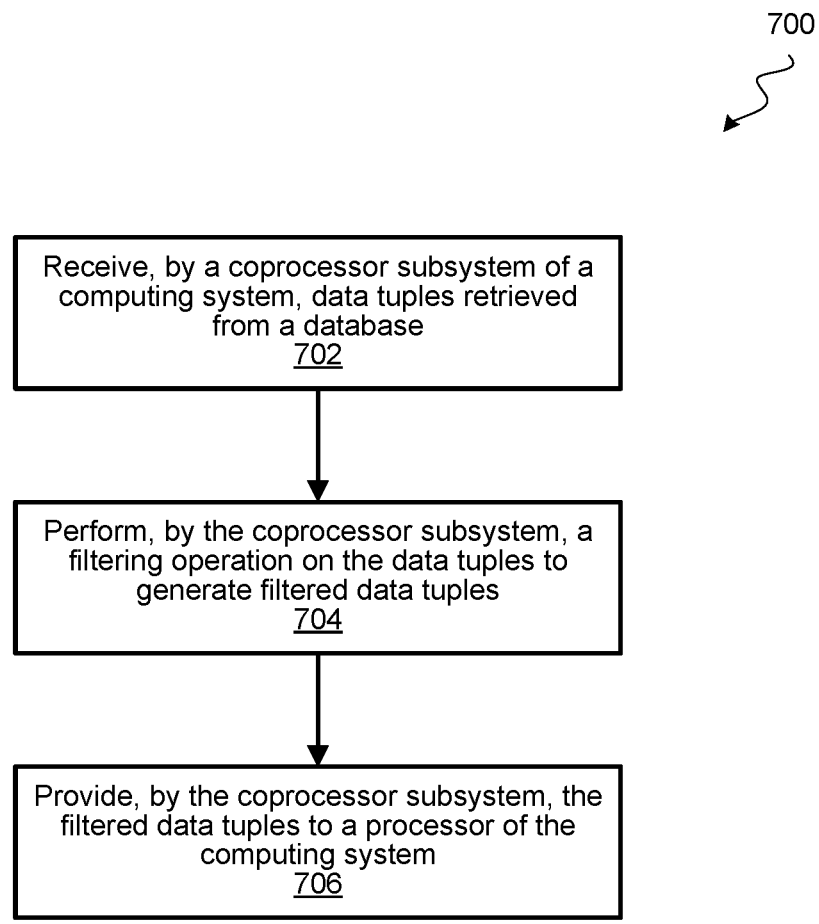
FIG. 7 illustrates a flow diagram of another example of an acceleration process.

FIG. 7 illustrates a flow diagram of another example of a process 700 for accelerating database operations. Process 700 can be performed, for example, by a coprocessor subsystem of a computing device, or other suitable integrated circuit device to offload the operations from a processor. Process 700 may begin at block 702 by the coprocessor subsystem receiving data tuples retrieved from a database. The data tuples may include string data tuples and/or numeric data tuples. Furthermore, the data tuples can also be of variable length.

At block 704, the coprocessor subsystem performs a filtering operation on the data tuples to generate filter data tuples. For example, the coprocessor subsystem may include a coprocessor that receives numeric data tuples, and a string accelerator that receives string data tuples. In some imple- mentations, the string accelerator may filter the string data tuples and provide the filtered string data tuples to the coprocessor. The coprocessor may filter the numeric data tuples and rely on the string accelerator to filter the string data tuples. In some implementations, the string accelerator may align the string data tuples without performing the filtering, and provide the aligned string data tuples to the coprocessor. The coprocessor may filter both the string data tuples and the numeric data tuples. The string accelerator may provide additional hints to the coprocessor to speed up the filtering performed by the coprocessor. For example, the string accelerator may provide metadata indicating which string data tuple matches a certain character, a set of characters, a substring, and/or a full string, and the copro- cessor may use this information to filter the string data tuples. In some implementations, the string accelerator and/ or the coprocessor can also perform data replacement in the data tuples before providing them to the processor.

At block 706, the coprocessor subsystem provides the filtered data tuples to the processor of the computing system. The filtered data tuples can be data tuples that matches a data pattern or a combination of data patterns, or can be data tuples that do not contain a data pattern or a combination of data patterns. The processor may then perform further processing on the filtered data tuples. By filtering the data tuples, the amount of data that the processor has to process can be reduced to speed up the database operations.

Figure 8:
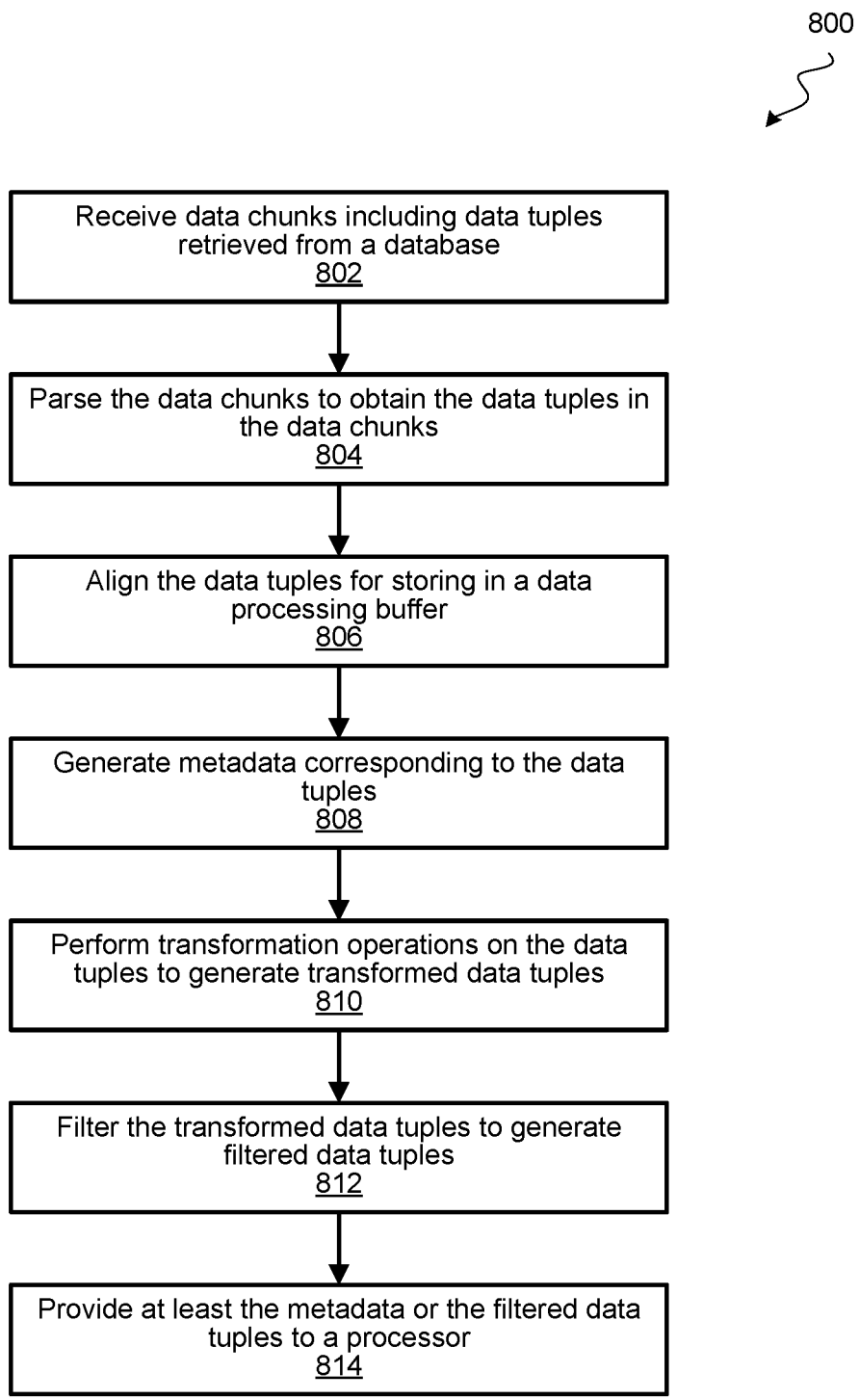
FIG. 8 illustrates a flow diagram of a further example of an acceleration process.

FIG. 8 illustrates a flow diagram of another example of a process 800 for accelerating database operations. Process 800 can be performed, for example, by a coprocessor subsystem, or other suitable integrated circuit device to offload the operations from a processor. The coprocessor subsystem may include a coprocessor and/or an accelerator. In implementations having both a coprocessor and an accel- erator, the operations performed by process 800 can be distributed between the two components in any suitable manner. In some implementations, the operations can be distributed based on the type of data being operated on. For example, the accelerator may process string data tuples, and the coprocessor may process numeric data tuples. The distribution of operations can also be based on a combina- tion of the data type and the type of operation.

Process 800 may begin at block 802 by receiving data chunks including data tuples of variable lengths and/or fixed lengths retrieved from a database. The data tuples can be, for example, string data tuples. The data chunks being received may concatenate the data tuples together. In some imple- mentations, each data tuple includes a header at the begin- ning of the data tuple. Alternatively, the header of each data tuple can be received on a separate data stream. The header may include a length field indicating the length of each data tuple. For fixed length data tuples, the length can be pro- vided in a header or be programmed in the coprocessor subsystem.

At block 804, the data chunks are parsed to obtain the data tuples in the data chunks. For example, the header of each data tuple may contain the length of the data tuple indicating the number of bytes in the data tuple. A counter can be used to count the number of sequential bytes in the data chunks to determine where the current data tuple ends and the next data tuple begins based on the length indicated in each header. For fixed length data tuples, the counter can be set to count to a constant value. The data tuples can also be parsed according to one or more programmable delimit character(s) or value(s).

At block 806, the data tuples in the data chunks are aligned for storing in a data processing buffer. The data processing buffer may include fixed length data entries. In some implementations, every data duple may start at the beginning of a data entry, and data tuples that are longer than a data entry may span multiple data entries. In some implementations, if additional data tuple(s) can fit entirely in a data entry following another data tuple, the additional data tuple(s) can be store in the same data entry. The additional data tuple(s) can be concatenated together, or be spaced apart at predetermined byte widths in the data entry.

At block 808, metadata is generated for each data entry in the data queue. The metadata generated for each data entry may include a bit mask vector indicating a location of each data tuple stored in the data entry, or a starting index of the data tuple in the data entry and a length of the data tuple. The metadata may also include, for each data entry, the number of valid bytes in the data entry, the number of data tuples in the data entry, the number of starting data tuples in the data entry, and/or the number of ending data tuples in the data entry. The metadata may also include indications of whether any configurable data patterns are present in the data tuple, and/or locations of the data patterns in the data tuple.

At block 810, transformation operations can be performed on the data tuples to generate transformed data tuples. The transformation operations may include data replacement operations to replace one or more data patterns (e.g., characters, numeric values) with corresponding substitute data patterns. The transformation operations may also include data insertion, data deletion, and/or data transposition. Any transformation operations performed on the data tuples can be also reflected in their corresponding metadata.

At block 812, the transformed data tuples can be filtered to generate filtered data tuples. For example, process 800 may retain data tuples that contain a certain data pattern, or lack a certain data pattern. The filter operation can also be performed based on other characteristics of the data tuples such as a length of the data tuple and/or other metadata associated with the data tuple. The filtering operation can reduce the workload of the processor by limiting or reducing the amount of data forwarded to the processor.

At block 814, at least the metadata generated for the data tuples or the filtered data tuples are forwarded to the processor. In some implementations, only the metadata corresponding to the filtered data tuples are forwarded to the processor without the data tuples. In some implementations, the metadata corresponding to all data tuples are forwarded to the processor without the data tuples. The metadata of the filtered data tuples can also be forwarded with the filtered data tuples to the processor. The metadata of the all data tuples can also be forwarded with all the data tuples to the processor. The selection of whether to forward the metadata and/or the data tuples can be programmed in the coprocessor system.

It should be understood that one or more operations described in process 800 can be omitted, and that the operations can be performed in a different order or sequence. For example, the transformation operations can be omitted, or be performed after the filtering operation. Furthermore, the coprocessor subsystem may perform other operations not specifically shown. For example, the coprocessor subsystem may perform aggregation operations on the data tuples parsed from the data chunks or on the filtered data tuples to generate aggregation results, which are forwarded to the processors with or without the metadata and/or data tuples.

Figure 9:
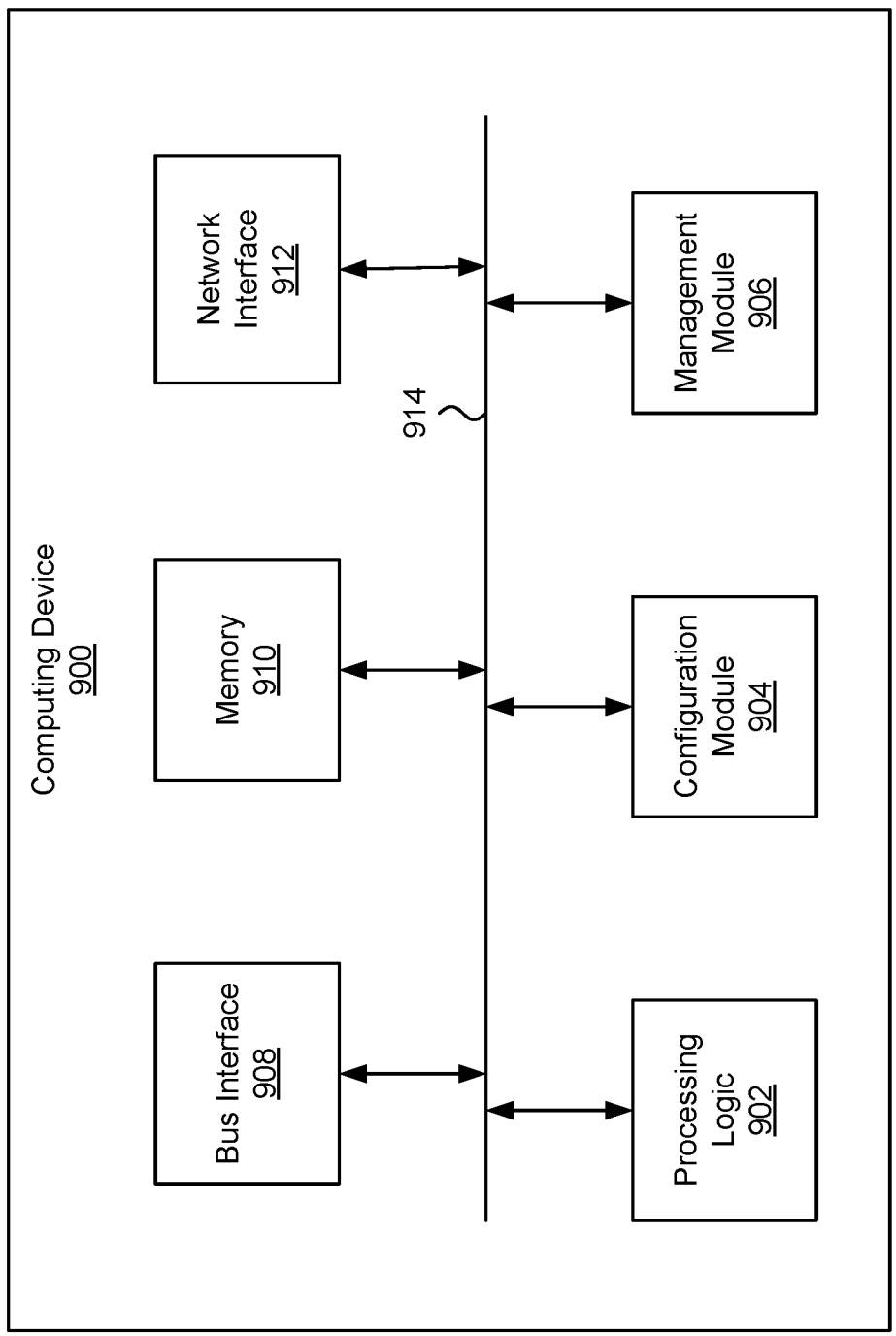
FIG. 9 illustrates a block diagram of an example of a computing device.

FIG. 9 illustrates an example of a computing device 900. In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, not illustrated here, such as components discussed with respect to the nodes disclosed in FIG. 10. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM©, MIPS©, AMD©, Intel©, Qualcomm©, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 10.

Figure 10:
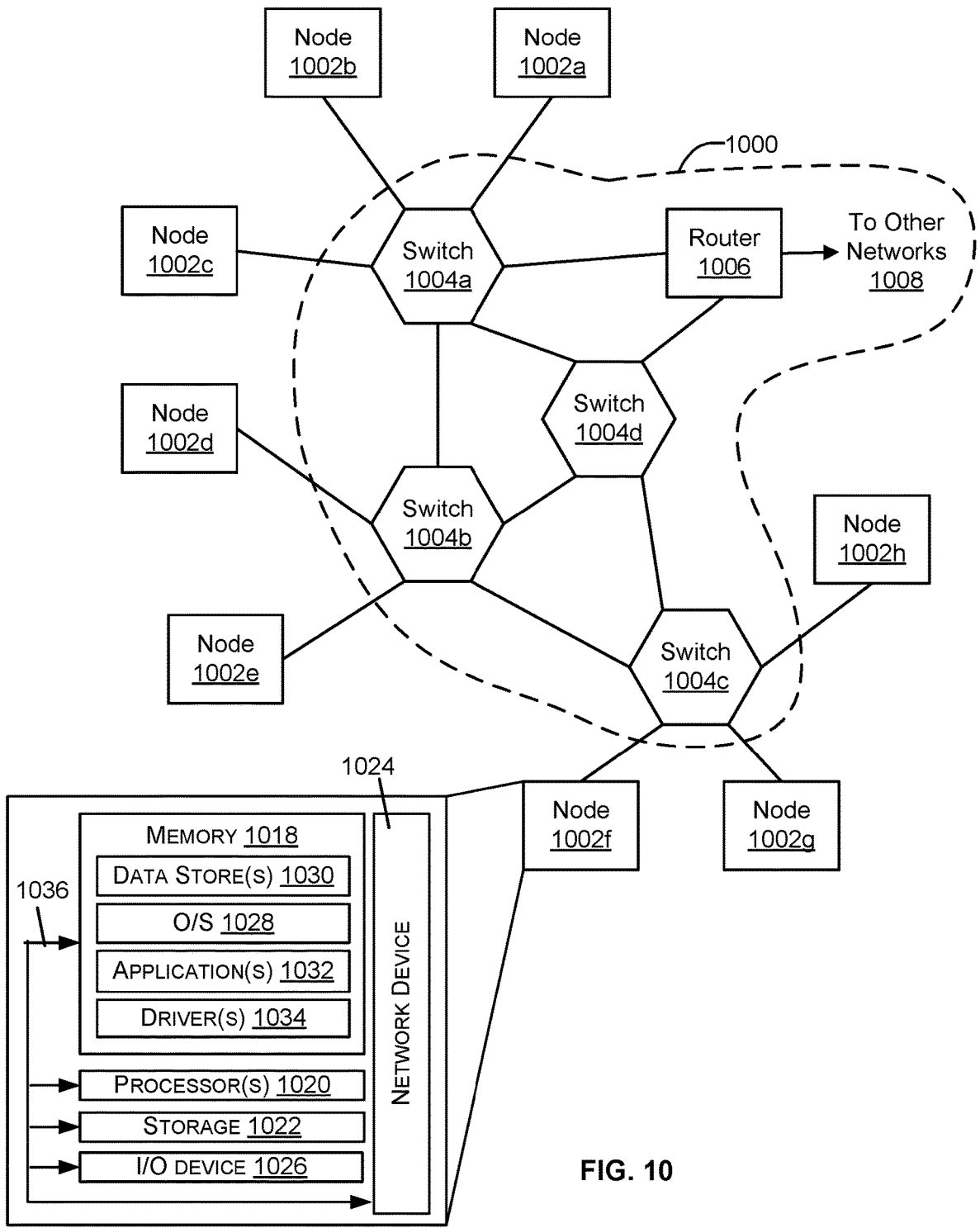
FIG. 10 illustrates a block diagram of an example of a network.

FIG. 10 illustrates a network 1000, illustrating various different types of network devices 900 of FIG. 9, such as nodes comprising the network device, switches and routers. In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. A computing device 900 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices 900 for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices 1004. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000. The network device(s) 1024 of FIG. 10 may include similar components discussed with reference to the computing device 900 of FIG. 9.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 908 may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A database processing system comprising:
a processor operable to process queries to a database; and
a coprocessor subsystem to offload database operations from the processor, the coprocessor subsystem including:
a coprocessor operable to:
receive numeric data tuples retrieved from the database;
filter the numeric data tuples; and
provide the filtered numeric data tuples to the processor; and
a string accelerator to offload string operations from the coprocessor, the string accelerator operable to:
receive string data tuples retrieved from the database;
filter the string data tuples; and
provide the filtered string data tuples to the coprocessor.

2. The database processing system of claim 1, wherein the string accelerator is further operable to:
determine whether a set of one or more characters is present in each of the string data tuples; and
provide, to the coprocessor, an indication of which of the string data tuples contain the set of one or more characters.

3. The database processing system of claim 2, wherein the string accelerator is further operable to:
provide, to the coprocessor, a location of the set of one or more characters in each string data tuple that contains the set of one or more characters.

4. The database processing system of claim 1, wherein the string accelerator is operable to replace one or more characters in the string data tuples with one or more substitute characters.

5. The database processing system of claim 1, wherein the coprocessor is operable to replace numeric data in the numeric data tuples with configurable substitute data.

6. The database processing system of claim 1, wherein the string accelerator is operable to determine whether a substring is present in the string data tuples, and provide to the coprocessor an indication of which string data tuples contain the substring.

7. The database processing system of claim 1, wherein the string accelerator is operable to compare a full string to each of the string data tuples, and provide to the coprocessor an indication of which string data tuples match the full string.

8. The database processing system of claim 1, wherein the coprocessor is operable to determine whether a numeric data pattern is present in each of the numeric data tuples.

9. The database processing system of claim 1, wherein the string accelerator is operable to perform data formatting operations for the coprocessor.

10. The database processing system of claim 1, wherein the coprocessor subsystem is operable to:
parse data chunks retrieved from the database to obtain a set of data tuples;
perform aggregation operations on the set of data tuples to generate aggregation results; and
provide the aggregation results to the processor.

11. The database processing system of claim 1, wherein the coprocessor subsystem is operable to:
parse data chunks retrieved from the database to obtain a set of data tuples;
filter the set of data tuples to generate a set of filtered data tuples;
perform aggregation operations on the set of filtered data tuples to generate aggregation results; and
provide the aggregation results to the processor.

12. The database processing system of claim 1, wherein the coprocessor subsystem is operable to:
parse data chunks retrieved from the database to obtain a set of data tuples;
align the set of data tuples for storing in a data processing buffer;
generate metadata corresponding to the set of data tuples;
perform transformation operations on the set of data tuples to generate transformed data tuples;
filter the transformed data tuples to generate a set of filtered data tuples; and
provide at least the metadata or the set of filtered data tuples to the processor.

13. A method comprising:
processing, by a processor of a database processing system, queries to a database;
offloading, to a coprocessor subsystem of the database processing system, database operations from the processor, the database operations including filtering, by a coprocessor of the coprocessor subsystem, numeric data tuples retrieved from the database;
providing, by the coprocessor, the filtered numeric data tuples to the processor;
offloading, to a string accelerator of the coprocessor subsystem, string operations from the coprocessor, the string operations including filtering, by the string accelerator, string data tuples retrieved from the database; and
providing, by the string accelerator, the filtered string data tuples to the coprocessor.

14. The method of claim 13, wherein the string data tuples are variable length data tuples.

15. The method of claim 13, wherein the numeric data tuples are fixed length data tuples.

16. The method of claim 13, further comprising performing a transformation operation on the numeric data tuples prior to filtering the numeric data tuples, or on the string data tuples prior to filtering the string data tuples.

17. The method of claim 16, wherein the transformation operation includes replacing one or more data patterns with one or more corresponding substitute data patterns.

18. The method of claim 16, wherein the transformation operation includes data transposition.

19. The method of claim 16, wherein the transformation operation includes data deletion.

20. The method of claim 13, further comprising performing a transformation operation on the filtered numeric data tuples prior to providing the filtered numeric data tuples to the processor, or on the filtered string data tuples prior to providing the filtered string data tuples to the coprocessor.

21. The method of claim 13, further comprising:
comparing, by the string accelerator, a full string to each of the string data tuples; and
providing, by the string accelerator, an indication of which string data tuples match the full string.

22. The method of claim 13, further comprising:
determining, by the string accelerator, whether a substring is present in the string data tuples; and
providing, by the string accelerator, an indication of which of the string data tuples contain the substring.

23. The method of claim 22, further comprising:
providing, by the string accelerator, a location of the substring in each of the string data tuples containing the substring.

\* \* \* \* \*